United States Patent [19]

Frei

[11] Patent Number: 4,815,668

[45] Date of Patent: Mar. 28, 1989

[54] PROCESS AND DEVICE FOR WORKING UP HOUSEHOLD, INDUSTRIAL AND OTHER SIMILAR WASTE

[75] Inventor: Josef Frei, Oberehrendingen, Switzerland

[73] Assignee: Organ-Faser Technology Company N.V., Netherlands

[21] Appl. No.: 43,374

[22] Filed: Apr. 28, 1987

[30] Foreign Application Priority Data

Apr. 28, 1986 [DE] Fed. Rep. of Germany ....... 3614325

[51] Int. Cl.$^4$ ............................................. B02C 21/00
[52] U.S. Cl. ....................................... 241/23; 241/24; 241/29; 241/79.1; 241/152 R; 241/DIG. 38
[58] Field of Search ..................... 241/79.1, 79, 24, 29, 241/19, 75, 76, 77, 78, DIG. 38, 23, 152 R

[56] References Cited

U.S. PATENT DOCUMENTS 4,341,353  7/1982  Hamilton et al. ...... 241/DIG. 38 X
4,610,396  9/1986  Serra et al. ............. 241/DIG. 38 X

FOREIGN PATENT DOCUMENTS 3105597  10/1985  Fed. Rep. of Germany .

Primary Examiner—Mark Rosenbaum
Attorney, Agent, or Firm—Scully, Scott, Murphy & Presser

[57] ABSTRACT

A process for working up household, industrial and other similar waste for the recovery of a fibrous and/or granulated material, in which the waste material is subjected to preliminary comminution, magnetic separation, classification, drying and fractionation, wherein the light fraction resulting from the classification carried out after the magnetic separation is subjected to secondary comminution by cutting, and the heavy fraction to a predominantly granulating secondary comminution and thereafter both comminution products are recombined, dried and fractionated into fibrous matter and granulated material, is to be simplified, and in particular the costs reduced. This is achieved in that before the secondary cutting comminution appliance at least one part stream or the whole stream of the light fraction is diverted and fed directly and/or after comminution in a further comminution unit to further utlization. A device for carrying out the method is also proposed.

20 Claims, 1 Drawing Sheet

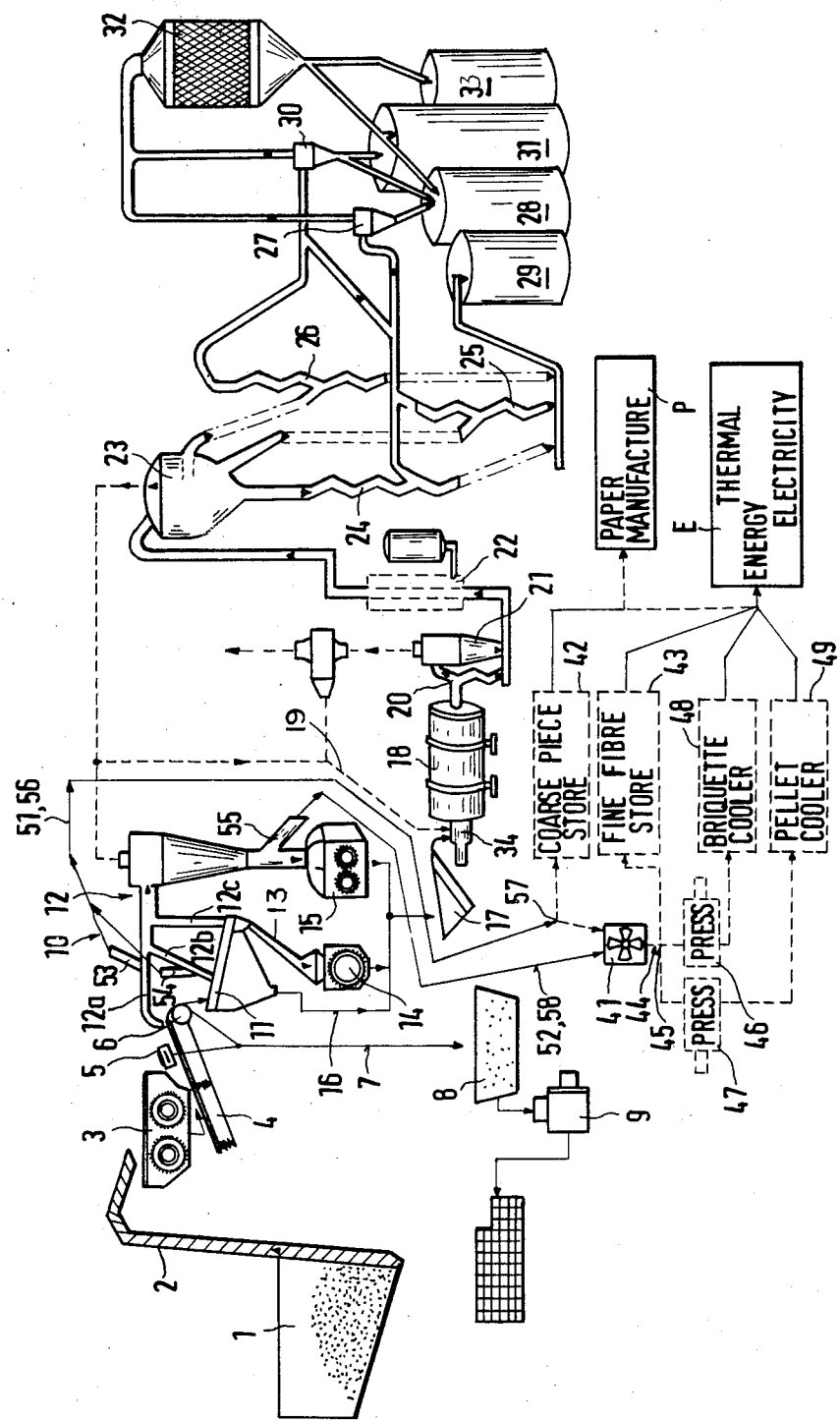

PROCESS AND DEVICE FOR WORKING UP HOUSEHOLD, INDUSTRIAL AND OTHER SIMILAR WASTE

TECHNICAL FIELD OF THE INVENTION

The invention relates to a process for working up household, industrial and other similar waste, and to a device for carrying out the process.

BACKGROUND OF THE INVENTION

Such a process and such a device are described and shown in German Pat. No. 31 05 597. In the known process, apart from a fraction consisting of magnetic metals and a granulate fraction, at least one light fraction is formed from the waste, passing through all the stages of the process and only being obtained at the end of the process. Since the light components make up the largest portion of the available waste, and considering that paper and packaging materials make up around 40% of the waste, the known process involves a considerable expenditure of work, energy and time, and thus considerable operating costs, which increase the cost of the fractions.

OBJECT OF THE INVENTION

The object of the invention is to simplify both a process of the above-mentioned type and a device.

SUMMARY OF THE INVENTION

This object is achieved through the characterising features of claims 1 and 11 respectively.

In the process according to the invention at least one further fraction is created which also meets the requirements set, or some special requirements, while avoiding relatively expensive fractionating measures. The invention proceeds from the appreciation that a substantial part of the waste, at the latest after a primary comminution, meets the requirements set for the desired fractions. The process and apparatus according to the invention make it possible to separate this portion from the process stream after the air classification and already before the secondary cutting comminution and feed it directly, or indirectly via a further comminutor, to the further utilization. Thus no expensive further treatment in the sense of the known process is needed for the additional fraction hereby created, so that the simplification and saving in cost aimed at are achieved.

In the event that, at least at times, the components of the waste meet the requirements from the start, the whole stream can be removed from the process path and treated in the sense according to the invention, thereby avoiding the unnecessary expense that is incurred in the known process in these circumstances in treating components of the waste that already meet the requirements.

In tests it has been shown that the components of the waste meeting the requirements can be sorted out before drying. This is made possible by separation by air classification, in which sticky components are detected as "heavy fraction" and therefore not separated out, so that the fraction separated out contains only relatively little moisture. Tests show around 18 to 20%.

A further advantage of the measures according to the invention is that the air classification includes automatic regulation of the quantity of the components of the waste that already meet the requirements and are to be separated out, so that in most cases no particular special regulation of this quantity is needed.

In the arrangement according to the invention the additional fraction can be fed at will directly to the further utilization and/or to a further comminution whereby either a coarse-fibred or a fine-fibred fraction is created as desired. Both fractions can, as desired, be fed directly to the further utilization either without or with further treatment.

The device according to the invention makes it possible to carry out the process according to the invention by simple and economic means. It is true that when a fine-fibred structure of the additional fraction is desired an additional comminutor, preferably in the form of a hammer mill, is required, but this expense is significantly less than the operating expense resulting from the known process and the known device. With the known plant for further treatment a large quantity of energy is saved, particularly in the drying, and the further treatment units can also be designed for a smaller capacity, whereby the production and operating costs of the device can be considerably reduced.

In the sub-claims advantageous further developments of the invention are described. With regard to these it is emphasized that the diverted light fraction has an optimum pressing moisture, for which reason it is very easy to compact into briquettes or pellets. In addition through the second secondary comminution a fine fraction is obtained which is suitable, both when compacted and when uncompacted, for further utilization in paper manufacture or gasification (internal combustion, fermentation gas extraction, pyrolysis).

BRIEF DESCRIPTION OF THE DRAWING

The invention will now be explained in more detail with reference to an exemplary embodiment shown in the FIGURE of the drawing, which shows a device for working up household, industrial and other similar waste.

DETAILED DESCRIPTION OF A PREFERRED EMBODIMENT OF THE INVENTION

Referring to the drawing, the waste is tipped into a collecting bunker 1. Preferably waste is used which has not fermented at all, or only for a short time, and has not been subjected to any treatment like primary comminution, presorting, compaction on tips, or of a chemical nature. The use of fresh organic waste has the advantage that the fibrous basic raw material can be given the desired structure, and that the important components like cellulose and lignin have not been removed or destroyed.

The waste bunkered in this way arrives, continuously or discontinuously, at a primary comminution unit 3 via a mechanical conveyor 2. The purpose of this is on the one hand to loosen the delivered waste into its loose components and on the other hand, by cutting, chopping and/or ripping, to reduce the waste, which is very varied in its size and composition, to a permissible size for further processing. For this step cutter or beater mills as well as choppers or rippers can be used. In order to ensure trouble-free processing, and to achieve the desired structure, fineness and purity of the end product, it is preferred to use a slow-running cutting mill of which various designs are commercially available. Conveniently a design with multiple cutter blocks lying next to one another and running counter to one another is employed. In addition the multiple cutter blocks should work at low speed and the individual blocks at different speeds. In addition all the blocks should be reversible to ensure safety performance and automatic cleaning. Such a machine is commercially available under the name "SHREDDER". Similar machines with the same name are also employed for breaking up used cars and other sheet metal products.

The waste thus broken up by the primary comminuting unit 3 and primarily comminuted to a size of about 100 mm falls freely on to a conveyor 4 consisting of a vibrating transport channel.

In order to ensure trouble-free operation in the following parts of the plant it is important that pieces of iron which may be present in the waste should be completely separated out. In order to achieve this, the conveyor 4 conveys the waste as a uniformly aligned, relatively thin moving layer past a magnetic belt unit 5 arranged above the conveyor 4 and at the end throws it on to a rotating drum magnet 6 underneath. Since the quantities of waste emerging from the primary comminuting unit 3 flucutate, the conveyor 4 is provided before the magnetic belt unit 5 with a levelling arrangement (not shown).

The magnetic belt unit 5 has the object of separating out the pieces of iron present in the upper half of the moving layer. The rotating drum magnet 6 serves to remove the pieces of iron lying in the lower half of the moving layer of waste.

The magnetic units 5 and 6 are connected via a conveyor 7 to a collecting bunker 8. From the collecting bunker 8 the metal which has been separated out arrives in a press 9, which compacts the pieces of iron which have been separated out into commercial briquettes which can subsequently be supplied to a scrap metal foundry.

The waste freed from pieces of iron in this way is then fed to a first fractionating unit 10. The latter has a vibrating screen 11 for producing a fine fraction, the mesh width of this screen being approximately 6 to 8 mm. The arrangement also includes a suction unit 12, directed towards the upper side of the vibrating screen 11, for producing a first, low density coarse fraction and, at the lower end of the inclined vibrating screen 11, a receiving conduit 13 to receive the material left on the fibrating screen 11, which either cannot pass through the screen because of its size or cannot be sucked off because of its weight, to produce a first high density fraction.

Such a separation into three first fractions gives the advantage that the following comminution units 14 and 15 are relieved of those fine pieces which do not exceed the desired final size. The proportion of these fine pieces normally amounts to about 15% by weight, i.e. about 15% energy is saved in the subsequent comminution. The fine material thus separated out is mixed back again with the waste which has undergone secondary comminution in the two comminution units 14 and 15, via a by-pass line 16 that avoids these units.

The suction unit 12 can consist of a commercial appliance, such as is employed e.g. in the chip and fodder industry. The low density material sucked off out of the stream of waste by the suction unit 12 via the suction lines 12a, 12b and 12c, consists mainly of paper, cardboard, foil, textiles and wood chips, i.e. pieces of organic material and is fed for the last structuring and comminution to the comminution unit 15 constructed as a fine chopper. Such comminution units are available commercially under the name fine choppers, chippers or fine mills. It has been found convenient to use rotary comminutors in which rotary cutters work against fixed cutters or rotary cutters against rotary cutters and which are provided with a permeable barrier to obtain the final material size.

The high density second coarse fraction, freed by the fractionating unit 10 both from the fine pieces and from the low density pieces, and consisting in practice predominantly of pieces of inorganic material, is subjected in the separate comminution unit 14 to a granulating comminution procedure. The comminution unit 14 has the object of bringing the different pieces of incoming waste to the final size that is desired and required for complete further utilization, corresponding to a sieve mesh width of around 6 mm. Such comminution units 14 are commercially available under the designation hammer, impact or beater mills, and can be employed if they have a permeable barrier adjusted to the smallest particle size to be obtained.

The fractions coming from the comminution units 14 and 15, as well as from the by-pass line 16, are fed together to a collecting container 17. From the latter the stored material is fed to a drying and sterilizing unit 18. This unit 18 has the object of drying the resulting material to a definite, constant residual moisture content, and destroying the substances in the material which are undesirable on health grounds, such as e.g. pathogenic bacteria. To this end temperatures of over 100° C. can be reached in the drying and sterilizing unit 18, and the residence time in the drying and sterilizing unit 18 can likewise be regulated. The supply of hot dry air from the heating device 34 via the recirculation line 19 and the exhaustion of the air enriched with moisture take place continuously and can likewise be regulated so as to enable the residual moisture content of the material emerging from the drying and sterilizing unit 18 to be regulated to a desired value in this way.

After the drying and sterilizing unit 18 the material thus treated is divided by means of a separating device 20 into a low and a high density fraction, and thereafter the low density fraction is fed to an exhaust air separator 21 in the form of a separator cyclone to remove it from the moist exhaust air coming from the drying operation. The material emerging from the exhaust air separator 21 is thereupon recombined with a previously separated, high density fraction and fed via an ozone treatment arrangement 22 to a further fractionating unit 23. The latter has the object of dividing the incoming material, which is sterilized and dried to a definite maximum residual moisture content, into three intermediate fractions according to particle size, the sizes of the pieces of one intermediate fraction being smaller than 3 $mm^2$, those of the second intermediate fraction lying in the range from 3 to 6 $mm^2$ and those of the third intermediate fraction being above 6 $mm^2$. The fractionating unit 23 can have vibrating working surfaces. Preferably a lightly-built device with fibrating working surfaces is used. The amplitude direction and the frequency of oscillation should be variable so that the intensity and the residence time can be regulated according to the treatment of the material.

The three fractions emerging from the fractionating unit 23, each composed of organic (predominantly light) and inorganic (predominantly heavy) particles, are fed by separate routes to the final fractionation. For the final fractionation the air separators 24, 25 and 26 are used: these have the object of separating the raw materials such as minerals, nonferrous metals, synthetic materials, etc., from the organic materials with which they are mixed. Such air separators are commercially available in various designs and are likewise used in the foodstuffs, fodder and timber industry.

The fine fraction carried out of the fractionation unit 23 is carried pneumatically for final fractionation to the air separator 24, in which the material is introduced at a definite point into a counter-current of air. The strength of the air current is chosen so that the predominantly organic, low density particles are carried away by the air current, and the predominantly inorganic, high density particles fall downwards against the air current.

The light particles carried away are piped to a separating cyclone 27, which is arranged directly above the fibre silo 28 as a silo input.

The high density pieces falling downwards against the air current are fed to the granulated material silo 29.

The fraction coming from the fractionation unit 23 and lying, on the basis of density, between the fine and the coarse fractions, is fed for final fractionation to the air separator 25. The low density pieces separated out here can be piped as desired to the separators 27 or 30 and the silos 28 and 31. The predominantly inorganic, high density granulates coming from the air separator 25 are likewise fed to the granulated material silo 29.

The coarse fraction emerging from the fractionation unit 23 is piped for final fractionation to the air separator 26, which operates in the same manner as the two other air separators 24 and 25. The low density pieces separated out by the air separator 26, are likewise carried out into the silos 28 and 31 as desired. The predominantly inorganic, high density granulated material separated out by the air separator 26 arrives, mixed with the granulates from the air separators 24 and 25, in the granulated material silo 29.

The dust-laden exhaust air coming from the air separators 24, 25 and 26 and from the separators 27 and 30 is piped to a filter plant 32. The dust separated out there, which consists predominantly of fine organic particles, can be fed to the dust silo 33 or as desired to the silos 29 and/or 31.

The storage of the end products, comprising three fractions containing predominantly fibres and one dust fraction, in silos which are separated from one another simplifies and extends the possibilities for further utilization.

The predominantly inorganic, high density granulates coming from the air separators 24, 25 and 26 can of course also be stored separately from one another.

The material thus obtained can be further processed, e.g. for the manufacture of broads or other building materials or, for heating purposes, to briquettes or pellets. The material thus manufactured can also be used as fertilizers and soil conditioners, as an addition in asbestos, cement and tile products, or as an addition in artificial stones, bitumen coatings and concrete.

In the region between the suction unit 12 and the cutting comminution unit 15, at least one part stream of the light fraction picked up by the suction unit 12 is removed from the processing operation and, avoiding the further processing measures previously described, is fed to the further utilization either directly or via a further comminution unit 41, preferably a hammer mill with narrow beaters and a built-in sieve in order to determine structural dimensions for the fibre fraction produced therein and for the heavy material. Two stores 42, 43 are provided receive the directly-fed coarse fibres, namely laminar fibres up to a size of 100 mm, and the fine fibres (in the millimeter range) produced after secondary comminution by the comminution unit 41.

The conveyor 44 taking the light fraction, produced by secondary comminution, away from the comminution unit 41 has a deflector 45, from which three conveyors branch off, namely to the fine fibre storage place 43, to a briquetting press 46 and to a pelletizing press 47. In the presses 46, 47 the light fraction is made into briquettes or pellets. From the briquetting press 46 the briquettes arrive at a cooling store 48. The pellets from the pelleting press 47 arrive at a cooling store designated by 49, where the briquettes or pellets, as the case may be, can cool down.

The further utilization occurs in paper manufacture and/or in the production of energy in combustion power stations, which is shown diagrammatically in the drawing.

In the present exemplary embodiment two part or even whole streams are taken from the working-up operation at different points, one of which is designated by 51 and the other by 52. The part stream 51 branches off in the region of the suction unit 12 from suction channels 12a and 12b of the three suction channels 12a, 12b and 12c present, for which purpose branch pieces 53, 54 or deflectors, as the case may be, are provided. The other part stream 52 proceeds from a branch piece 55 or a deflector, as the case may be, which is arranged in the conveyor present between the suction unit 12 and the cutting comminution unit 15. The conveyor 56 carrying the first part stream 51 has a deflector 57, by means of which the coarse fibre fraction can as desired be conveyed either to the coarse fibre storage place 42 or to the comminution unit 41. The conveyor 58 carrying the second part stream 52 leads directly to the comminution unit 41.

Within the scope of the invention it is also possible to divert not just one or several part streams 51, 52 but even a whole stream, so that the whole of the light fraction picked up by the suction unit 12 is diverted. The amount of the streams is automatically controlled on the basis of the air classification or suction, as the case may be, being governed by the proportion of the light fraction in the waste. When a large proportion of light, air-floatable components is present in the waste the quantity picked up by the suction air 12 will also be large, otherwise it will be small.

It is however also possible to use branch pieces 53 to 55, which make it possible to control or regulate the quantity of the stream, e.g. by manual or automatic adjustment of the cross section.

The conveyors previously described can be mechanical or pneumatic conveyors.

The diversion of at least part of the light fraction gives the following advantages.

A further fraction of valuable material is created, which is admirably suited for paper manufacture and for the production of energy in combustion power stations.

The additional fraction of valuable material can be manufactured at minimum expense compared with the known fractions, so that it is substantially cheaper.

It has been found that the additional fraction of valuable material makes possible a saving in electrical energy of around 50% and a saving in heat energy of around 80% compared with the fractions running through the whole processing operation. An increase in the calorific value of the additional fraction of valuable material compared with the other fractions can also be achieved, namely a rise in calorific value of around 10 to 15%, which is caused by the increased proportion of synthetic material.

Since the proportion of valuable organic material in household rubbish amounts to around 50 to 70%, it is enlightening that the operating costs for processing can be considerably reduced, because treatment measures after the drying unit are either considerably reduced or no longer required. In this connection it should be noted that the main portion of the light components contained in the waste, namely around 80 to 90% by weight, is picked up by the suction unit 12.

Within the scope of the invention it is also possible to use the additional valuable material fraction as raw material in fermentation gas recovery.

We claim:

1. A process for working up household industrial and other similar waste for the recovery of a fibrous and granular material in which the waste material is subjected to primary comminution, magnetic separation, classification, drying and fractionation, wherein a light fraction from the classification carried out after the magnetic separation is subjected to secondary comminution by cutting, and a heavy fraction is subjected to secondary comminution predominantly by granulation, and thereafter both comminution products are recombined, dried at temperatures over 100° C. and fractionated into fibrous matter and granular material, characterized in that at least a part stream of the light fraction is diverted before the secondary comminution cutting device and is supplied to further utilization.

2. A process according to claim 1 wherein the light fraction is diverted in a suction unit with several suction channels, characterized in that in at least one of the suction channels a first stream of the light fraction is diverted before a first secondary comminution unit and a a second stream of the light fraction is diverted after the first secondary comminution unit, the first stream being supplied to the further utilization and the second stream being supplied to a second secondary comminution unit.

3. A process according to claim 2, wherein the fraction from the second secondary comminution unit is fed to a briquetting press for processing into briquettes.

4. A process according to claim 2, wherein the fraction from the second secondary comminution unit is fed to a pelleting press for processing into pellets.

5. A process according to claim 2, characterized in that the first stream is fed to a coarse fibre store.

6. A process according to claim 2, characterized in that the fraction from the second secondary comminution unit is fed to a fine fibre store.

7. A process according to claim 1, characterized in that the fraction contained in the first stream is further utilized as raw material in paper manufacture or in the production of energy.

8. A process according to claim 1, wherein the whole light fraction stream is diverted before the secondary comminution device.

9. A process according to claim 1, wherein the light fraction stream is fed to a coarse fibre store.

10. A process according to claim 1, wherein the light fraction stream is a further utilized as raw material for paper manufacture or production of energy.

11. A device for working up household, industrial or other similar waste for the recovery of fibrous and granular material, having a primary comminutor for primary comminution of the waste, a magnetic separator for separating magnetic metals, a classifier, a cutting secondary comminutor, a granulating secondary comminutor, apparatus for further fractionation of the waste and conveyors for continuous conveying of the waste through working-up stations, characterized in that between the classifier and the cutting secondary comminutor there is a branch for a part stream of a light fraction of the waste, which makes said part stream available for further utilization directly, by-passing further working-up measures.

12. A device according to claim 11, in which a suction unit with several section channels is used as a classifier, characterized in that from at least one of the suction channels there is a first branch for a part stream before a first secondary comminution unit and a second branch for a part stream, the first branch making the part stream directly available and the second branch being connected via a second secondary comminution unit to an arrangement serving the further utilization.

13. A device according to claim 12, characterised in that the first branch is connected to a coarse fibre store.

14. A device according to claim 12, characterized in that the second branch is connected to a fine fibre store.

15. A device according to claim 12, wherein the whole stream is diverted to the first branch for utilization.

16. A device according to claim 12, wherein the whole stream is diverted to the second branch for utilization after the second secondary comminution unit.

17. A device according to claim 12, wherein the second branch is connected to a briquetting press.

18. A device according to claim 17, characterized in that the briquetting press is connected by a conveying arrangement to a storage place.

19. A device according to claim 12, wherein the second branch is connected to a pelleting press.

20. A device according to claim 19, wherein the pelleting press is connected by a conveying arrangement to a storage place.

* * * * *